(No Model.)
R. KILMER.
BALE TIE.
No. 479,984. Patented Aug. 2, 1892.
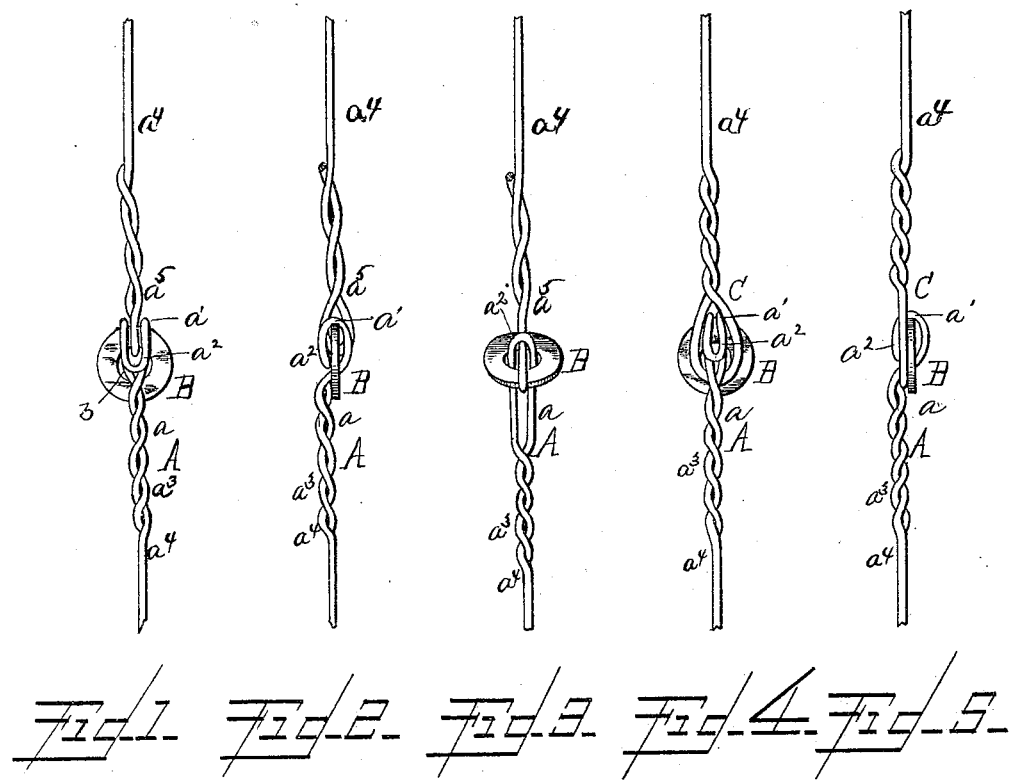
WITNESSES
F. L. Ourand
E. K. Stewart.
INVENTOR
Ransom Kilmer
per W. H. Singleton.
Attorney

UNITED STATES PATENT OFFICE.

RANSOM KILMER, OF NEWBURG, NEW YORK.

BALE-TIE.

SPECIFICATION forming part of Letters Patent No. 479,984, dated August 2, 1892.

Application filed February 10, 1892. Serial No. 420,998. (No model.)

*To all whom it may concern:*

Be it known that I, RANSOM KILMER, a citizen of the United States, residing at Newburg, in the county of Orange and State of New York, have invented certain new and useful Improvements in Bale-Ties; and I do hereby declare the following to be a full, clear, and exact description of the invention, such as will enable others skilled in the art to which it appertains to make and use the same.

This invention relates to an improvement in bale-ties, more especially to that class which are made of wire.

The object of the invention is to provide the bale-tie with a separate auxiliary catch or lock, which when the bale is released from the press engages both ends of the bale band or wire and holds the ends of the bale band or wire from separation.

The invention consists in a bale-tie having the construction pointed out and claimed.

As shown in the drawings, the present invention may be used in a bale-tie which is adjustable or for use on bales of different sizes or on a bale-tie which is known as a "dimension-tie"—*i. e.*, the tie is made for a bale of a given size.

Referring to the drawings, Figure 1 represents a plan view of the device used as an adjustable tie; Fig. 2, an edge view; Fig. 3, a plan view showing the tie after the bale is released; Figs. 4 and 5, plan and side views of the tie used as a dimension-tie.

In the drawings, the letter A indicates a bale-tie of wire. The end $a$ is turned first into a loop $a'$ and then into a hook $a^2$, the end $a^3$ being twisted upon the main strand $a^4$. Over this hook $a^2$ is slipped a ring B, which may be of sheet metal, wire, or other suitable material. The hook passes through the hole $b$ of this ring, and the end of the hook is pressed down so as to hold the ring B from displacement. Normally, or when ready for use, this ring B lies flat against the wire, as shown. This ring B forms a catch or lock, as will be shown, and it need not necessarily be round. The catch or lock may be of any given shape.

When this device is used as an "adjustable tie," the straight end $a^5$ of the bale-tie is slipped through the hole $b$ and over the ring, as shown in Figs. 1 and 2. As soon as the bale is released the pressure draws the parts until they assume the position shown in Fig. 3. Here the loop at one end of the bale is caught over the loop at the other end and the catch or lock holds them firmly together.

When this device is used as a dimension-tie, the hook $a^2$, with the catch or lock B, is slipped into the end or loop C and the catch or lock B bears against the wire of this loop, also, in this instance, locking or catching the two ends together.

I am made aware of United States Patent to J. M. Albertson, No. 166,677, dated August 17, 1875, wherein is shown a bale-tie the ends of which are formed in loops, which catch over a grooved block, the block being separate from the tie and slipped into place after the tie is placed around a bale.

In my device the catch or lock B is secured upon the hooked end of the tie so as to be held from displacement, the tie with its lock being thus held together and put around the bale together.

Having thus described my invention, what I claim is—

1. A wire bale-tie having a hooked end for engaging the other end of the tie and provided at such hooked end with an auxiliary catch or lock which is securely held by such hooked end.

2. The bale-tie A, having the end $a$, formed with a hook $a^2$ and provided with the auxiliary catch or lock consisting of a ring B, securely held by such hook, as set forth.

In testimony whereof I affix my signature in presence of two witnesses.

RANSOM KILMER.

Witnesses:
 E. D. FULLER,
 C. R. PAIGE.